US009328827B2

(12) United States Patent
Russell

(10) Patent No.: US 9,328,827 B2
(45) Date of Patent: May 3, 2016

(54) QUARTER TURN BALL VALVE WITH LIFT-OFF SEATS

(71) Applicant: Larry Rayner Russell, Houston, TX (US)

(72) Inventor: Larry Rayner Russell, Houston, TX (US)

(*) Notice: Subject to any disclaimer, the term of this patent is extended or adjusted under 35 U.S.C. 154(b) by 47 days.

(21) Appl. No.: 14/521,265

(22) Filed: Oct. 22, 2014

(65) Prior Publication Data

US 2015/0137018 A1 May 21, 2015

Related U.S. Application Data

(60) Provisional application No. 61/906,254, filed on Nov. 19, 2013.

(51) Int. Cl.
| | |
|---|---|
| *F16K 5/06* | (2006.01) |
| *F16K 5/20* | (2006.01) |
| *F16K 31/524* | (2006.01) |
| *F16K 31/528* | (2006.01) |
| *F16K 27/06* | (2006.01) |

(52) U.S. Cl.
CPC .............. *F16K 5/0647* (2013.01); *F16K 5/0605* (2013.01); *F16K 5/201* (2013.01); *F16K 5/204* (2013.01); *F16K 27/067* (2013.01); *F16K 31/528* (2013.01); *F16K 31/52425* (2013.01)

(58) Field of Classification Search
CPC ................ F16K 5/0647; F16K 27/067; F16K 5/20–5/201; F16K 5/204; F16K 5/0605; F16K 5/0636; F16K 31/52425; F16K 31/528; F16K 31/5284

USPC .......... 251/162–163, 315.01, 315.07–315.08, 251/315.12, 77, 229, 251
See application file for complete search history.

(56) References Cited

U.S. PATENT DOCUMENTS

| | | | | |
|---|---|---|---|---|
| 3,245,653 | A * | 4/1966 | Lavigueur | F16K 5/201 251/315.12 |
| 4,641,682 | A * | 2/1987 | Harris | F16K 5/201 251/163 |
| 4,676,480 | A * | 6/1987 | Garceau | F16K 5/201 251/163 |
| 5,611,516 | A * | 3/1997 | Reinicke | F16K 5/201 251/163 |
| 6,378,841 | B1 * | 4/2002 | Russell | F16K 5/201 251/162 |
| 6,681,793 | B2 * | 1/2004 | Mike | F16K 5/0636 251/163 |
| 7,267,323 | B1 * | 9/2007 | O'Callaghan | F16K 5/0636 251/315.12 |
| 7,775,502 | B2 * | 8/2010 | Ohta | F16K 5/0647 251/163 |

* cited by examiner

*Primary Examiner* — John Bastianelli
(74) *Attorney, Agent, or Firm* — Elizabeth R. Hall

(57) ABSTRACT

A method and apparatus for controlling fluid flow with a quarter-turn ball valve with seats operated to lift off the sealing surface of the ball valve prior to ball rotation and to reseat upon completion of the ball rotation. One embodiment shown relates to a quarter-turn ball valve having a rotatable cam with an eccentric camming disk that engages a cam pocket in the ball seats to reciprocally lift off the sealing surface of the ball valve prior to ball rotation and to reseat upon completion of the ball rotation. An embodiment is also shown that provides filler pieces that restrict that flow around the ball valve whenever the ball seats are lifted off the surface of the ball valve.

21 Claims, 8 Drawing Sheets

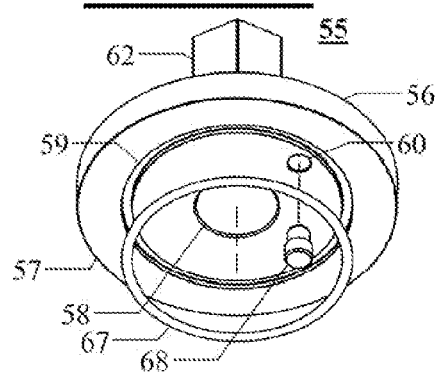
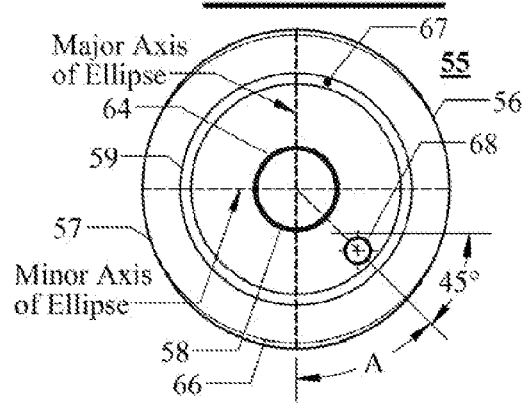
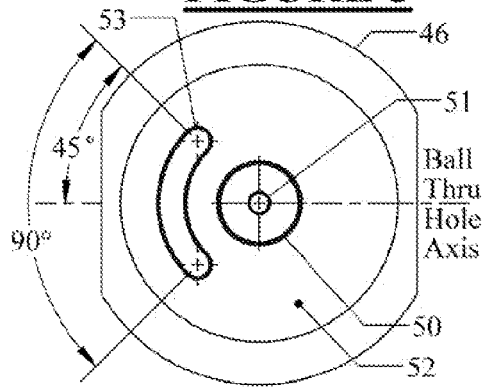
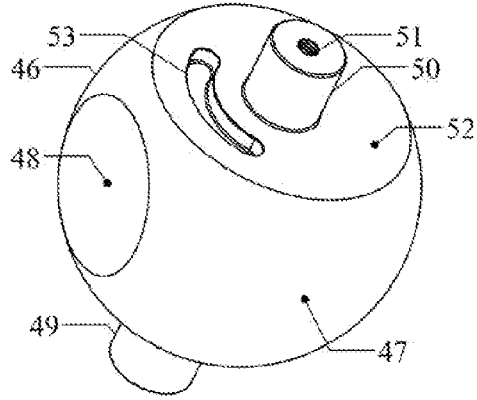
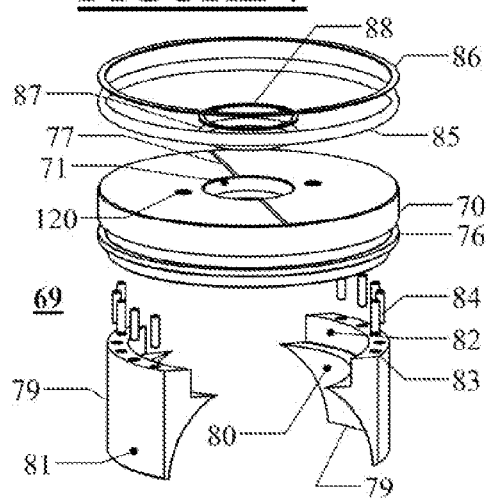
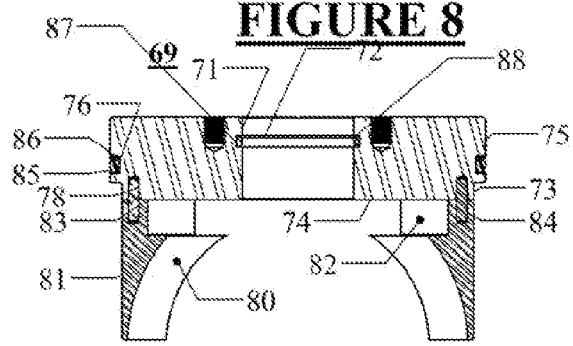

Ball Closed, Ready to Rotate Only Cam CCW

Ball Closed, Ready to Rotate Cam & Ball CCW

Ball Open, Ready to Rotate Cam CW to Close

Ball Open, Ready to Rotate Cam & Ball CW

QUARTER TURN BALL VALVE WITH LIFT-OFF SEATS

CROSS REFERENCE TO RELATED APPLICATIONS

The present application claims the benefit under USC 119 of the filing date of provisional application Ser. No. 61/906,254 filed Nov. 19, 2013 entitled "Quarter Turn Ball Valve with Lift-Off Seats."

BACKGROUND OF THE INVENTION

1. Field of the Invention

The present invention relates in general to a method and apparatus for controlling fluid flow using a rotary ball valve. More particularly, the invention relates to a quarter turn rotary ball with cam actuated reciprocating seats for controlling fluid flow in abrasive or high pressure conditions.

2. Description of the Related Art

Certain types of on/off valves have severely attenuated lives due to very concentrated flows with non-axial components during the initial stages of valve opening and final stages of valve closing. In particular, the seats of ball valves and rotary plug valves are susceptible to damage from this type of flow. A second problem which impacts valve actuation is high actuation forces and seat wear due to friction from relative motion of the seats and the sealing plug. This type of problem is common to ball valves, rotary plug valves, and gate valves.

Conventional quarter turn ball valves are commonly used for on/off control of fluid flows. Such conventional valves offer the advantages of simplicity, low fabrication costs, and a full bore flow path with attendant low pressure drops across the flowing valves. The seats of the conventional ball valves are spring loaded and also frequently pressure biased to bear against the ball, but their movement in service is negligible. The conventional valves are directly operated by 90° rotations of their directly connected stems.

However, the conventional valves do not perform well in abrasive flows or under high differential pressures. In such situations, when the valve is rotated sufficiently from its closed position so that an initial flow path is created between the bore of the ball and its seat, a high pressure differential flow is directed across the lenticular gap between the adjacent seating surface and the lip of the through hole of the ball. The same condition occurs during valve closure. The consequence of this situation is rapid erosive wear in the exposed region of the ball and seat. Such wear can quickly cause functional failure of the valve. Abrasive fluids further contribute to such erosive wear.

A critical need exists for a ball valve which is resistant to seat and ball erosion in high pressure and abrasive operation.

SUMMARY OF THE INVENTION

Embodiments of the present invention involve a ball valve that separates the valve seats from the ball sealing plug prior to and following rotation of the valve plug for actuation. The valve of this invention seals for pressure from either direction by using both upstream and downstream seats.

The disclosed valve will reciprocably separate the valve seat(s) from the sealing plug (e.g., a ball or plug) prior to actually moving the sealing plug, move the sealing plug to its new position, and reseat the valve seat(s) onto the sealing plug. This unseating/reseating of the valve seats is done for both opening and closing operations. The disclosed valve permits a considerable reduction in valve operating force, even under high pressures, and provides a temporary flow path during operation which is less susceptible to abrasive and cavitational wear than standard, non-reciprocating valves.

A third embodiment of the present invention The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is an oblique view of the exploded cam assembly of the present invention. The view is of the side which normally abuts the upper transverse surface of the ball.

FIG. 4 is a view looking axially upwardly at the side of cam which contacts the flat of the ball.

FIG. 5 is a view looking downwardly on the axis of the ball. This view shows the angular relationship of the arcuate slot of the ball with the through hole flow axis of the ball.

FIG. 6 is an oblique view of the ball of the present invention, showing the arcuate slot on an upper transverse surface of the ball.

FIG. 7 is an exploded view of the cavity seal assembly.

FIG. 8 is a transverse sectional view of the cavity seal assembly taken perpendicular to the axis of the valve.

DESCRIPTION OF THE PREFERRED EMBODIMENTS

Embodiments of the present invention involve a ball valve that separates the valve seats from the surface of the ball valve preparatory to and during rotation.

For the present invention, the term "quarter turn" refers to the motion of the ball, rather than the motion of its valve stem. The quarter turn reciprocating seat ball valve of the present invention utilizes a rotary cam having a lost motion linkage to a ball valve to separate the seats of the valve from the ball prior to its rotation to either a fully open or fully closed position. The cam is rotated 180° by the valve stem, either simultaneously or following completion of the ball valve rotation, and the seats are reseated against the ball. The present invention is not suitable for metering flow.

When the seats are cammed off the surface of the ball valve preparatory to and during rotation, the flow passing between the seats and the ball is limited due to the placement of static structural elements which constrict the bypassing flow around both the outer spherical ball surface and the cam during the valve rotation. These flow restrictions limit the flow between the ball and its seats as the seats are separated from the ball, thereby minimizing potential wear of the ball and seats. The valve is housed in a bonneted body and can be serviced in-line. The valve is particularly suited for use with abrasive fluids or high pressure gas service.

The lost motion linkage used to operate the valve of the invention requires a 180° rotation of the valve stem, rather than the conventional 90° rotation. The valve can be operated either manually or by means of an actuator. In the case of the manually operated valve, a two-to-one motion multiplying gear box is used to convert the desired 90° motions of the handle to the 180° motions required for the valve stem to operate the valve. If a mechanical actuator is used, it can either provide a longer stroke or utilize a two-to-one motion multiplying gear box.

The materials of construction of the valve 10 of the present invention are high strength low alloy steel and stainless steel. Typically, the valve stem, the ball and its seats, the seat bias springs, and the bonnet seal ring will be stainless steel, while the body, bonnet, and other components will be high strength low alloy steel. Other than the bonnet seal ring, the seals of the valve will be elastomeric O-rings and backup rings. The bonnet seal ring is a commercially available stem seal.

Figure 1:
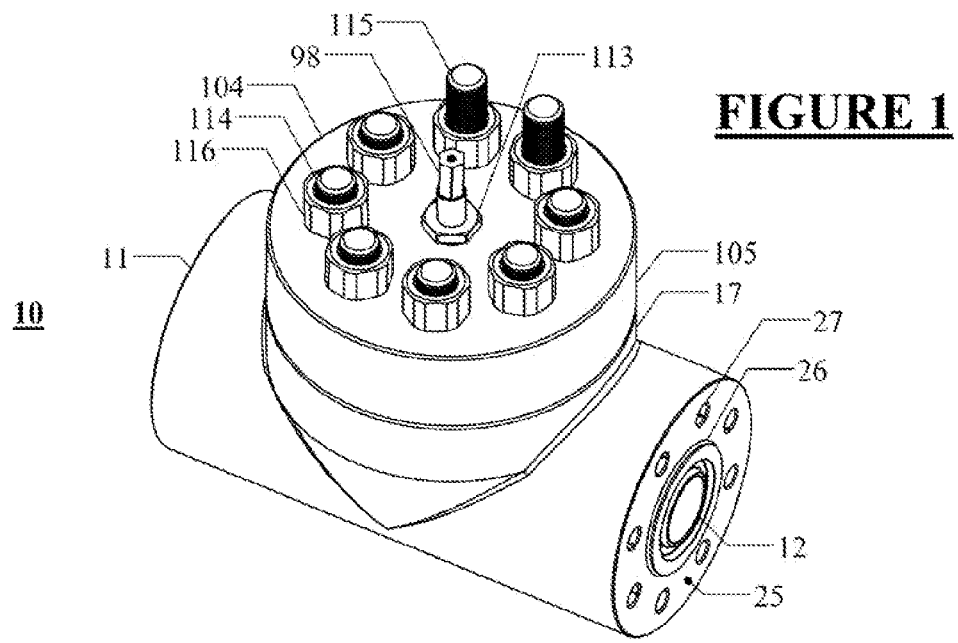
FIG. 1 is an oblique view of the quarter turn reciprocating seat ball valve of the present invention.

Referring to FIG. 1, the assembled valve 10 of the present invention is seen in an oblique view. The general configuration of the body 11 corresponds to that of a conventional top entry quarter turn ball valve, with the top entry transverse port 19 closed by a bolted bonnet flange assembly 104 and an operating valve stem 94 extending through a central hole in the bonnet 105. Two of the bonnet studs 115 are elongated in order to permit an actuator to be mounted thereon.

The actuator is not otherwise described herein, but it provides a selectably reversible 180° rotation for actuating the valve 10. The transverse flow outlet body ends 25 of the body 11 are each provided with seal grooves 26 and a circular array 27 of drilled and tapped mounting bolt holes. The valve may thus be connected into a flanged piping system by means of an array of threaded studs with nuts and a sealing ring on each end.

Figure 2:
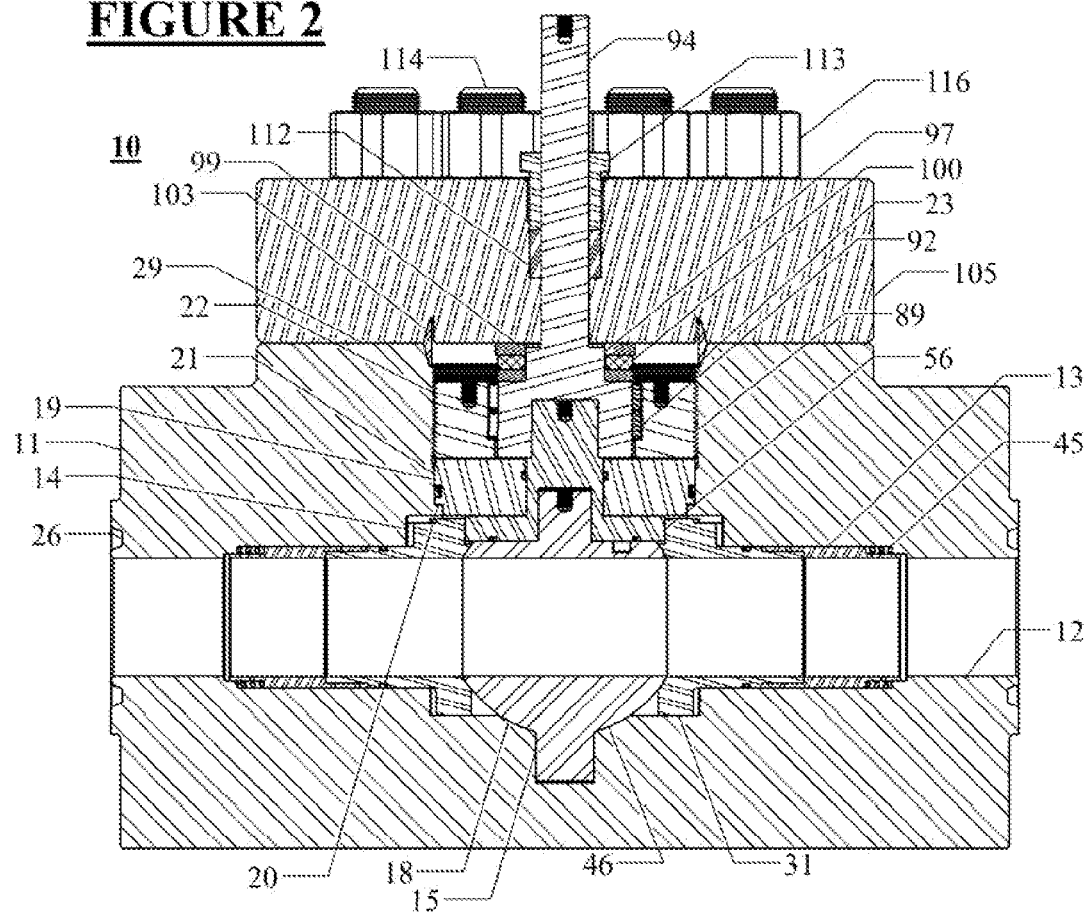
FIG. 2 is a longitudinal cross-sectional view of the open valve of FIG. 1.

FIG. 2 shows a longitudinal sectional view of the open valve 10. The body 11 has a main cylindrical section intersected perpendicularly at midlength by an enlarged bonnet extension 17. A longitudinally extending through bore has symmetrically opposed flow passages 12, with the inner portion of the flow passages having stepwise enlarged counterbores providing opposed seat pockets 13 intersecting the central cavity 15 of the body.

The seat pockets 13 each have, from their outer ends, a short first counterbore, a slightly larger diameter relatively long central second counterbore to house the central portion of the seat assembly 31, and a further enlarged diameter third counterbore to house the enlarged outer end of a seat 31. Each seat pocket 13 has a short rectangular cross-section keyway 14 extending outwardly from the transition between the second and third seat counterbores on the upper side of the seat pockets 13. The keyways 14 are located on the bonnet side of the seat pockets 13.

The centrally positioned transverse port 19 extends upwardly from the flow axis of the body 11. At its inner end and concentric both with midpoint of the flow axis of the valve and the axis of the transverse port, the lower central cavity 15 of the body 11 has a hemispherical bore 18. The hemispherical bore 18 of the central cavity 15 is a close fit to the spherical outer surface of the ball 46.

Figure 24:
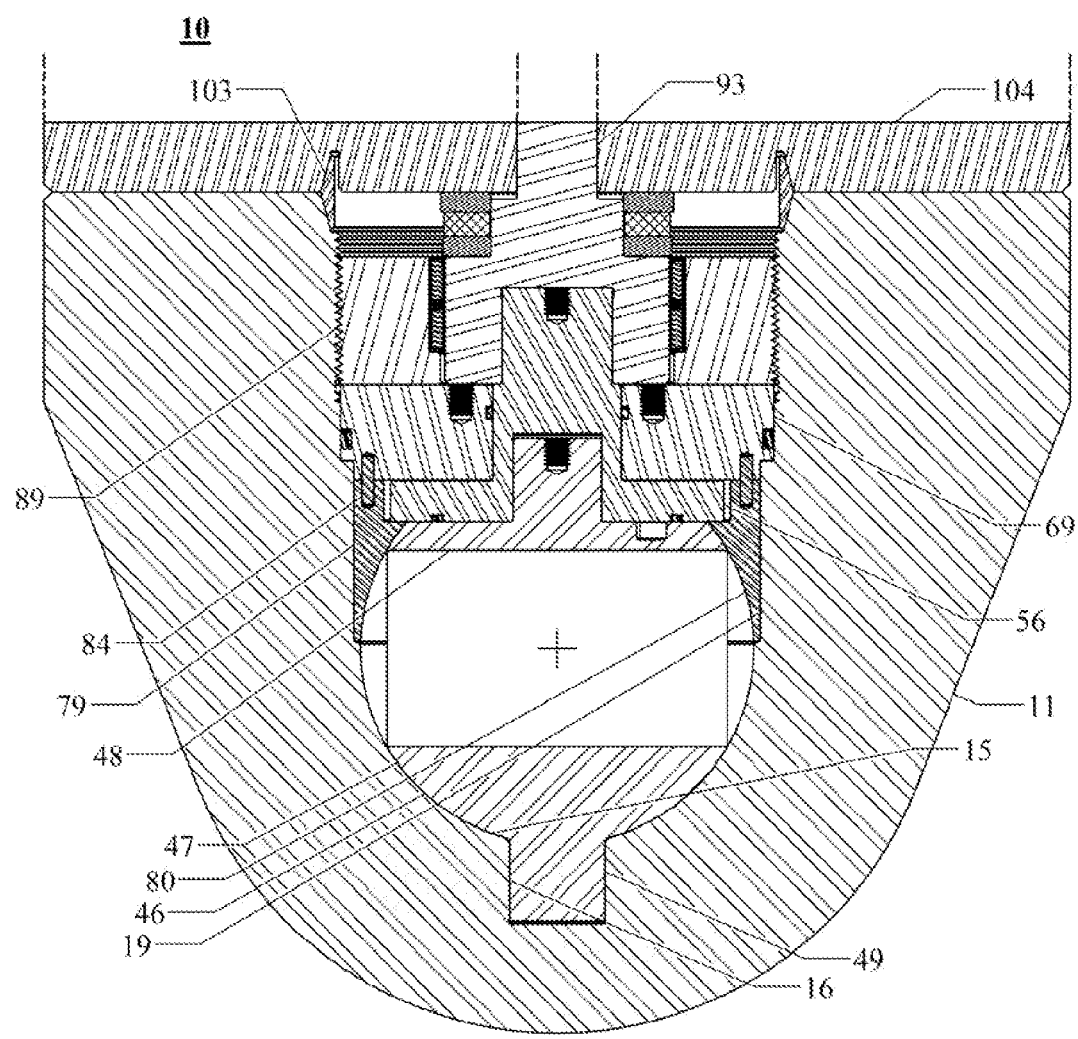
FIG. 24 is a transverse sectional view of the valve assembly with the seats cammed off the ball, but the ball still in its closed position.

As seen in FIG. 24, coaxial with the transverse port 19 of the body 11 and extending outwardly and downwardly from the hemispherical bore of the central cavity 15 is a cylindrical pivot hole 16. The pivot hole 16 is concentric with the central cavity 15 and provides a rotational and translational support to the lower pivot pin 49 of the ball 46. Slightly above the horizontal plane intersecting the flow passages 12 of the body 11, a first counterbore 101 of the transverse port 19 extends upwardly and outwardly approximately half of the diameter of the ball 46, where it meets an outwardly facing transverse internal shoulder 20. The first counterbore 101 is cylindrical and slightly larger than the diameter of the ball.

A short enlarged intermediate bore 21 extends outwardly from the shoulder 20, where it is joined by a thread relief and then an upwardly extending female threaded bore 22. At the outer end of the threaded bore 22 of the transverse port 19, a female seal groove 23 is sealingly engagable by a metallic seal ring 103 to permit sealing between the body 11 and the bonnet 105. The transverse bonnet mounting face 29 at the outlet of the transverse port has a concentric array of drilled and tapped bonnet bolt holes 27.

Figure 9:
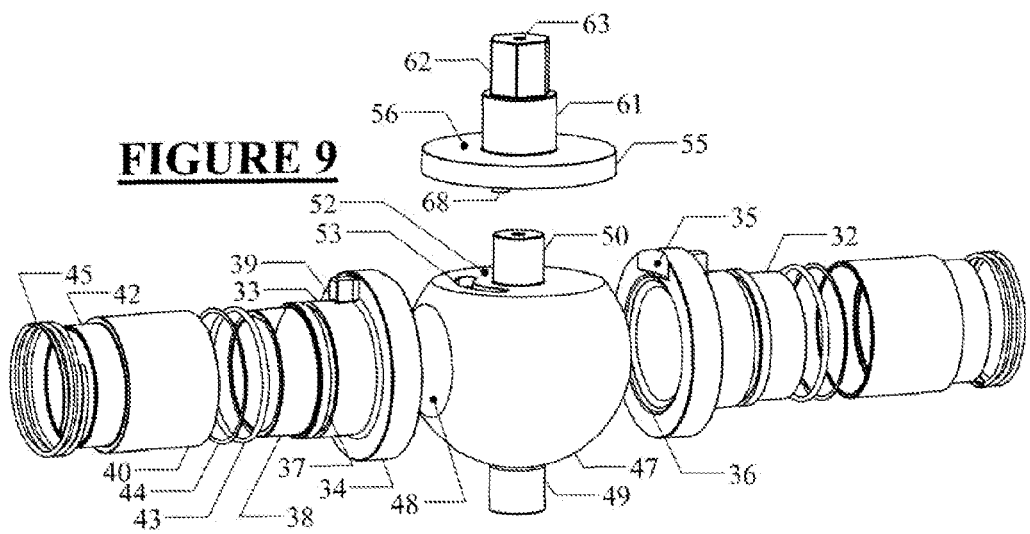
FIG. 9 is an exploded view of the ball, the ball seat assemblies, and the cam assembly.
Figure 10:
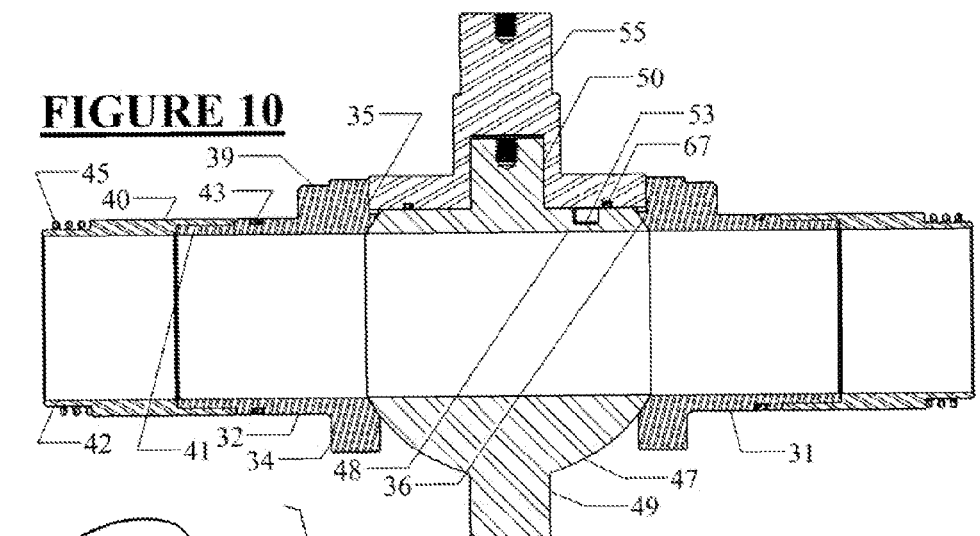
FIG. 10 is a longitudinal view of the ball, its seat assemblies, and the cam assembly, wherein the ball is in its open position.

A pair of identical tubular seat assemblies 31 are mounted in opposed positions in the seat pockets 13 of the body 11. As seen in FIGS. 9 and 10, each seat assembly 31 consists of a main seat 32, a seat extension 40, a male O-ring 43 with a backup ring 44, and a helical seat bias spring 45.

The seat 32 is cylindrical with a straight bore equal to the bores of both the body 11 and the ball 46. At its inner end which will abut the ball 46, the seat 32 has an enlarged upset cylindrical head 34 having a transverse inner end adjoined on its inward side by a spherical seating face 36 sealingly compatable with the ball 46 of the valve. The spherical face 36 on its inward side intersects the bore of the seat 32.

Although the spherical seating faces 36 of the seats 32 can provide metal-to-metal sealing, in highly abrasive environments, provision of an annular molded-in elastomeric seat in the central portion of each spherical face 36 is often desirable, although it is not shown herein. Such a modification is well understood by those skilled in the art and would not change the basic behavior of the valve 10, although it would improve sealing with abrasive fluids.

A reduced diameter external cylindrical body section 33 having an intermediate O-ring groove 37 extends radially outwardly from the enlarged cylindrical head 34 of the seat to an inwardly extending intermediate transverse shoulder. The O-ring groove 37 contains male O-ring 43 and backup ring 44. A further reduced diameter shank 38 then extends from that intermediate shoulder outwardly to a transverse outer end of the seat. A rectangular cross-section external antirotation key 39 extends outwardly a short distance from the outer transverse face of the upset head 34. The key 39 has a slip fit with the keyway 14 of the seat pocket 13 of the body 11. The length of the key 39 is equal to or slightly less than the length of the keyway 14.

The upset head 34 of the seat 32 has a slightly smaller diameter than that of the third counterbore of the seat pocket 13. The cylindrical body 33 of the seat 32 has a close slip fit to the second counterbore of the seat pocket 13 so that the O-ring 43 can seal between the seat pocket 13 and the body 33 of the seat 32. The reduced diameter shank 38 of the seat 32 has a slip fit to the counterbore 41 of the inward end of the seat extension 40.

Coplanar with the antirotation key 39 of the seat 32 and on the opposed transverse face where the spherical seating face 36 is, a cam pocket 35 is located. The cam pocket 35 is relatively shallow and symmetrical about the midplane of the antirotation key 39. The inner end of the cam pocket 35 is spaced a short distance outwardly of the outer diameter portion of the spherical seating face of the seat 32. The pocket 35 extends to the outer diameter of the upset head 34 of the seat. Looking radially along the midplane of the antirotation key 39, the profile of the cam pocket 35 is slightly elliptical to match the elliptical minor diameter region of the cam 56.

The inner end of the seat extension 40 has the same outer diameter as that of the cylindrical body 33 of the seat 31. The outer end of the seat extension 40 has a loose slip fit to the helical compression seat bias spring 45. The external outwardly facing shoulder of seat extension 40 is abutted by the seat bias spring 45 in order to bias the seat assembly 31 against the ball 46. The outward end of the seat bias spring 45 abuts the inwardly facing transverse shoulder of first counterbore of its seat pocket 13. Because the outer diameter of the spherical sealing face 36 is less than the outer diameter of the cylindrical body 33 of the seat 32, the upstream seat also is biased against the ball 46 by retained pressure when the ball is closed.

The ball 46, seen in FIGS. 5, 6, and 9, has a smooth spherical sealing surface 47 with a radially projecting reduced diameter cylindrical lower pivot pin 49 on its lower side. The lower pivot pin 49 is journaled in the pivot bore of the body 11. A diametrically extending through bore flow passage 48 is perpendicular to the axis of the lower pivot pin 49. On its upper side, the ball has a transverse face 52 perpendicular to the pivot axis and sufficiently offset from the midheight of the ball to permit the spherical sealing face 36 of the seat 32 to comate with and fully seal with the seat assemblies 31.

A cylindrical upper pivot pin 50 extends radially upwardly from the transverse face 52 of the ball. The upper transverse end of the upper pivot pin 50 has a central drilled and tapped extraction hole 51 to simplify insertion and extraction of the ball 46 from the central cavity 15 of the valve 10.

An arcuate, constant radius camming slot 53 extending 90° is located on the outwardly facing upper transverse face 52 of the ball 46. The camming slot 53 has a close slip fit to the camming pin 68 of the cam assembly 55. The distal ends of the camming slot are rounded with a radius which closely matches the radius of the camming pin 68.

The cam assembly 55 of the valve 10, seen most clearly in FIGS. 3, 4, and 9, consists of a cam 56, an O-ring 67, and a camming pin 68. The cam 56 has an elliptical disk 57 having a central constant diameter bore 58 normal to and extending upwardly from its lower face. The bore 58 has a close slip fit with the upper pivot pin 50 of the ball 46. A face seal O-ring groove 59 concentric with the lower bore 58 is located on the lower face of the disk. O-ring 67 is mounted in groove 59.

Referring to FIGS. 3 and 4, a short upwardly extending cylindrical blind hole 60 which serves as a mounting point for the camming pin 68 is perpendicular to the lower face of the cam 56 and offset from the bore 58. The radius extending from the center of cam 56 to the center of the camming pin hole 60 is at an angle A from the major axis of the elliptical disk 57 of the cam. Stepped cylindrical camming pin 68 is press-fitted into the hole 60.

The upper face of the elliptical cam 56 has a central round upper pivot pin 61 extending upwardly from the disk 57 of the cam 56. The upper end of the pivot pin 61 has a regular hexagonal extension 62. As seen in FIG. 4, the angle between the radius to the camming pin hole 60 and the hexagonal extension 62 is fixed at 45° and is independent of the value of angle A. The transverse upper end of the pivot pin 61 has a central drilled and tapped hole 63 for manipulation and extraction of the cam 56. FIG. 6 also shows with a dashed line a circle having a diameter equal to the minor diameter of the ellipse of the cam 56. The eccentricity of the cam is relatively small, but it is sufficient to cause the seats 32 to displace from contact with the ball 46.

The cavity seal assembly 69 is seen in an exploded view in FIG. 7 and a transverse cross-sectional view in FIG. 8. The cavity seal assembly 69 consists of a cavity seal disk 70, two opposed filler pieces 79, mounting dowel pins 84 for the filler pieces, and both male and female O-rings 85 and 87 with backup rings 86 and 88.

The cavity seal disk 70 has a constant diameter central through hole 71 having a female O-ring groove housing O-ring 87 and backup ring 88. On its external cylindrical face, the cavity seal disk 70 has a reduced diameter lower section 73, a downwardly facing transverse shoulder 74, and an enlarged upper cylindrical section 75 with a male O-ring groove 76. O-ring 85 and backup ring 86 are mounted in the O-ring groove 76.

The upper face of the cavity seal disk 69 has a shallow diametrical alignment groove 77, along with a pair of diametrically opposed drilled and tapped extraction holes 120. The alignment groove 77 permits the cavity seal disk assembly 69 to be closely aligned during assembly with the through bores 12 of the body 11 of the valve 10.

The lower face of the cavity seal disk 70 has a pair of mirror image regularly spaced mounting holes 78 for a pair of filler pieces 79. The holes 78 are symmetrical about the alignment groove 77. The mounting holes 78 are all at the same radius from the center of the cavity seal disk 70, and the two sides of the pattern of mounting holes are symmetrical about the alignment groove 77.

The filler pieces 79 are best seen in FIGS. 7 and 8. The filler pieces 79 are made to have externally cylindrical outer faces 81 which have a close slip fit into the straight first counterbore 101 of the body 11 of the valve 10. The upper and lower ends of the filler pieces 79 are perpendicular to the cylindrical axis of the parts. The lower interior faces of the filler pieces have a spherical surface which is a close fit to the diameter of the ball valve 46. The center of the spherical cut face 80 is on the cylindrical axis of the filler piece 79 a short distance below its lower end.

On the upper interior side of the filler pieces 79, a short cylindrical counterbore extends downwardly to a transverse shoulder to form a cam pocket 82. The radius of the cam pocket 82 is slightly more than half of the major diameter of the elliptical disk 57 of the cam 56, and the depth of the cam pocket is also slightly more than the thickness of the elliptical disk 57.

The upper transverse face of each filler piece 79 has a regular array of dowel pin mounting holes 83 positioned on the same radius as the mounting holes 78 of the cavity seal disk 70. The mounting holes 83 are on the same pattern as the mounting holes 78 on the lower face of the cavity seal disk 70. Dowel pins 84 are used to cojoin the filler pieces 79 to the lower side of the cavity seal disk 70.

Figure 11:
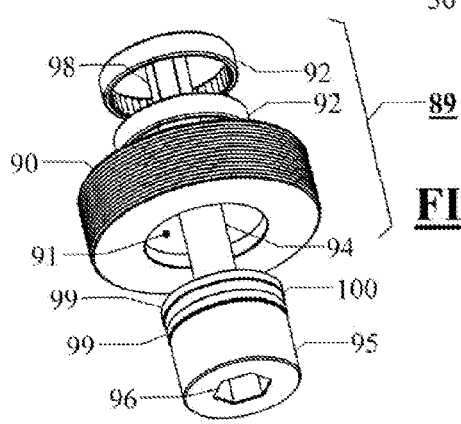
FIG. 11 is an oblique partially exploded view of the keeper ring and valve stem assemblies.

The keeper ring assembly 89 shown in FIG. 11 consists of a threaded keeper ring 90 and a pair of radial needle bearings 92. The keeper ring 90 retains by clamping the cavity seal disk 70, thereby preventing both axial and rotary motion of the disk. The threaded keeper ring 90 is a concentric right circular ring having a counterbore 91 on its upper side. The external threads are compatable with the threads of the bore 22 near the outer end of the transverse port 19. A pair of diametrically opposed drilled and tapped holes is on the upper transverse face of the keeper ring 90 for applying torque and easing insertion and removal in the body 11. Two radial needle bearings 92 are pressed into the counterbore of the ring 91.

The valve stem assembly 93 shown in FIG. 11 consists of the valve stem 94, and a pair of hardened thrust washers 99 with a caged needle thrust bearing 100 located between the thrust washers. The valve stem 94 has an enlarged cylindrical lower head 95 with an elongated coaxial cylindrical upper extension. The lower end of the lower head 95 of the valve stem has an upwardly extending coaxial hexagonal socket 96 for engagement with the hexagonal extension 62 of the cam 56. The length of the lower head 95 is generally about 70% of its diameter.

Immediately above the lower head 95, the valve stem 94 has a short constant diameter pilot section 97 which has a close slip fit with the two hardened thrust washers 99. A caged needle thrust bearing 100 is positioned between the thrust washers 99 and then both the washers and the thrust bearing are positioned around the pilot section to bear against both the upper transverse end of the lower head 95 of the valve stem 94 and also against the lower face of the bonnet 105. At its upper end, the valve stem has a coaxial upper male hexagonal section 98 for engagement by a handle, an intermediate gear box, or a valve actuator. The attachments for rotating the valve stem assembly 93 are not shown herein. The corner to corner dimension of the upper hexagonal section 98 is equal to or less than the diameter of the upper portion of the valve stem. The upper transverse end of the valve stem 94 has a concentric drilled and tapped hole for retention of a handle or actuator.

A commercially available metallic seal ring 103 has a straight bore and two symmetric opposed frustoconical exterior faces. The seal ring has opposed narrow transverse ends. When the metallic seal 103 is installed in the seal groove 23 of the body 11 and the bonnet flange 105, the seal is radially compressed to provide metal to metal sealing against the seal grooves 23 of the body 11 and 106 of the bonnet 105.

The bonnet assembly 104 consists of the bonnet 105, a shaft seal 112, a shaft seal retainer nut 113, standard length bonnet mounting studs 113, elongated bonnet mounting studs 115 for actuator mounting, and hex nuts 116 for the studs. The bonnet 105 is a disk having a concentric seal groove 106 on its lower side. The seal groove 106 has a short frustoconical outer face, a transverse interior end, and a cylindrical interior side to accommodate the metallic seal ring 103. The bonnet 105 has a coaxial stepped shaft hole 107, the lower end of which has a close fit to the upper cylindrical end of valve stem 94.

The middle portion of the shaft hole 107 has a short right circular cylindrical shaft seal counterbore 108 for housing the commercially available shaft seal 112. The upper portion of the shaft hole has an enlarged female thread to engagement by the threads of the shaft seal retainer nut 113.

The bonnet 105 is mounted onto the body 11 of the valve 10 by means of threaded studs 114 and 115 with hex nuts 116. The bonnet has a regular circular array of through mounting bolt holes corresponding to the pattern on the bonnet mounting face 29 of the body 11 of the valve 10. The threaded studs 114 and 115 are engaged in the tapped holes array 27 of the body 11 and the hex nuts 116 are then used to mate the bonnet 105 to the body. With the bonnet bearing on the outer end of the bonnet extension 17, the seal ring 103 is engaged to prevent leakage in the joint.

Operation of the Invention

In many ways, the quarter turn reciprocating seat ball valve 10 of the present invention is structurally and operationally similar to a conventional quarter turn ball valve. Such conventional valves are suited for on/off service but are not well suited for metering flows. The conventional valves also are not well suited for very high pressure applications, particularly with gas. The conventional valves generally do not perform well in high pressure gas or abrasive flow situations when opening and closing under pressure. However, the quarter turn reciprocating seat ball valve 10 of the present invention will be able to operate successfully both in gas and abrasive flows with high pressure differentials.

Because during seat displacement the cam 56 applies forces to the seats 32 which are eccentric from the centerlines of the seats, the seat extensions 40 are used to extend the length of the seat assemblies 31 and thereby reduce the transverse reactions on the seat assemblies produced by the eccentric cam loads. The lengths of the seat and seat extension 40 are limited by what can pass through the transverse port 19 of the body 11 for installation in a seat pocket 13. Combining a seat 32 with a seat extension 40 permits easy installation while reducing transverse loads on the seat assembly 32.

When the ball 46 of the present invention is in its initially closed position as seen in FIG. 10, the seats 32 are biased to abut the ball by their respective seat bias springs 45, thereby preventing flow. This condition is shown in FIGS. 2, 10, 12, 16, and 20. Additionally, if the ball valve 10 is closed and is retaining upstream pressure, then a pressure bias urges the upstream seat 32 against the ball 46. This is because the outer diameter of the cylindrical body 33 of the seat 32 is greater than the outer diameter of the spherical seating face 36 of the seat.

In the following description of valve operation, it is assumed that the closed valve is initially retaining pressure. The views of the of the ball 46 and the cam 56 assemblies in FIGS. 12 to 15 are taken looking down the axis of the valve stem assembly 93 to the ball 46. Likewise, FIGS. 16 to 19 are taken with the same orientation.

Figure 12:
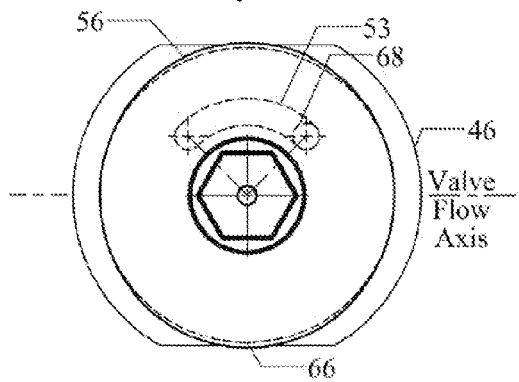
FIG. 12 is a view looking downwardly along the valve axis at the ball and cam in their closed position, wherein the cam has not displaced the seats from the surface of the ball.
Figure 16:
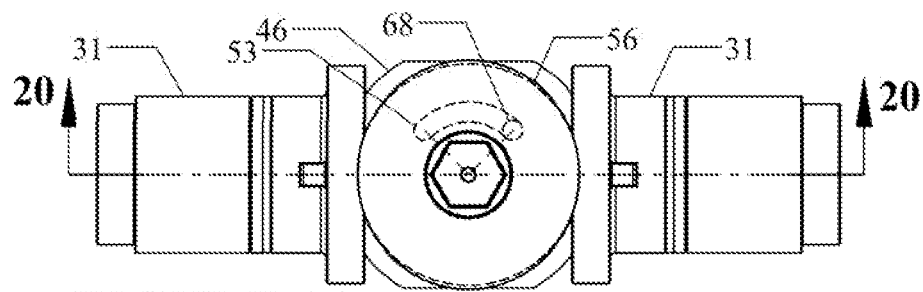
FIG. 16 is a plan view of the ball, cam, and seat assemblies, wherein the ball has been closed and the seats reseated by a clockwise rotation of the cam.
Figure 20:
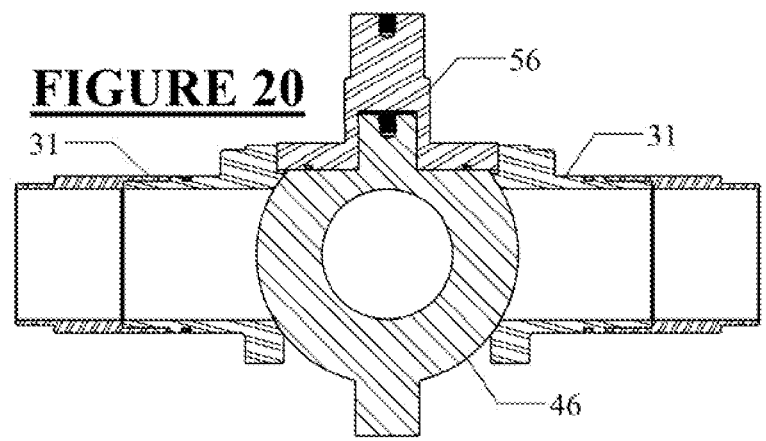
FIG. 20 is a longitudinal section taken through the assembly of FIG. 16 on the section line 20-20.

When the ball valve 10 is closed and the initial relationship of the cam 56, the seats 32, and the ball 46 are as shown in FIGS. 12, 16, and 20, the valve opening operation can be begun. First, the valve stem assembly 93 and its connected cam assembly 55 are initially rotated 90° without causing the ball 46 to open. The rotation of the cam assembly 55 does not entail rotation of the ball 46 during this initial operation because the camming pin 68 is able to move freely in the camming slot 53 of the ball 46. This initial rotation would be counterclockwise from the position shown in FIG. 12.

Due to necessary allowances for fabrication tolerances, the minor axis portion of the elliptical cam 56 typically is initially almost in contact with the cam pockets 35 of the seats 32 prior to the initiation of rotation of the valve stem 94 and cam 56. The initial valve stem 93 rotation first results in the elimination of any clearance gap between the cam 56 and the cam pockets 35 of the seats 32. A relatively initial high torque then is applied to the cam assembly 55 through the further rotation of the valve stem assembly 93.

This high initial torque is due to friction from relative motion between the cam 56 and the cam pocket 35 of the seats 32. If there is a high differential pressure sealed by the valve 10, the high contact force between the cam 56 and the cam pockets 35 on the upstream seat 32 is due to the pressure induced seating forces on the contact between the upstream seat and the ball 46. The resultant forces from the cam 56 on the seats 32 cause the seats 32 to be displaced from the surface of the ball 46 so that sealing is lost between the seats 32 and the ball 46. The torque required to displace the seats 32 from the ball 46 when the closed valve 10 is pressure balanced is much less than if the valve is sealing a differential pressure.

Because the loads applied to the seats 32 by the cam 56 are eccentric, the relative movement between the seats and the cam result in torques being applied to the seats about their centerlines. These torques are resisted by the antirotation keys 39 of the seats 32. The antirotation keys transfer their induced loads to the keyways 14 of the seat pockets 132 of the body 11. Additionally, the lengthening of the seat assemblies 31 by the provision of the seat extensions 40 reduces lateral frictional reactions on the seat assemblies.

When sealing is lost between the seats 32 and the ball 46, the forces required to further displace the seats are reduced and the torque on the valve stem assembly 93 from that source is reduced, although additional torque results from the shaft seal 112 of the bonnet assembly 105 on the valve stem 94, the bearings 92 and 100, and the pressure induced frictional resistance of the O-ring 87 of the cavity seal assembly 69.

With the seats 32 separated from the spherical surface 47 of the ball 46 but prior to ball 46 rotation by the cam assembly 55, some flow bypasses the closed ball 46 through clearance gaps between the ball, the valve body 11, the cavity seal assembly 69, and the cam 56. These gaps can be seen in the transverse cross-sectional view through the valve stem 94 axis in FIG. 24. However, this flow is comparatively restricted due to the small size of those bypass gaps in comparison to the size of the gaps between the ball and its cammed-off seats. The spherical sealing surface 47 of the ball 46 is a close fit to both the spherical lower portion of the central cavity 15 of the body 11 and the inner spherical faces 80 of filler pieces 70 of the cavity seal assembly 69. Likewise, the flow gap between the cam 56, the filler pieces 79, and the cavity seal disk 70 is also relatively small and severely restricts erosive flow through that gap.

Figure 25:
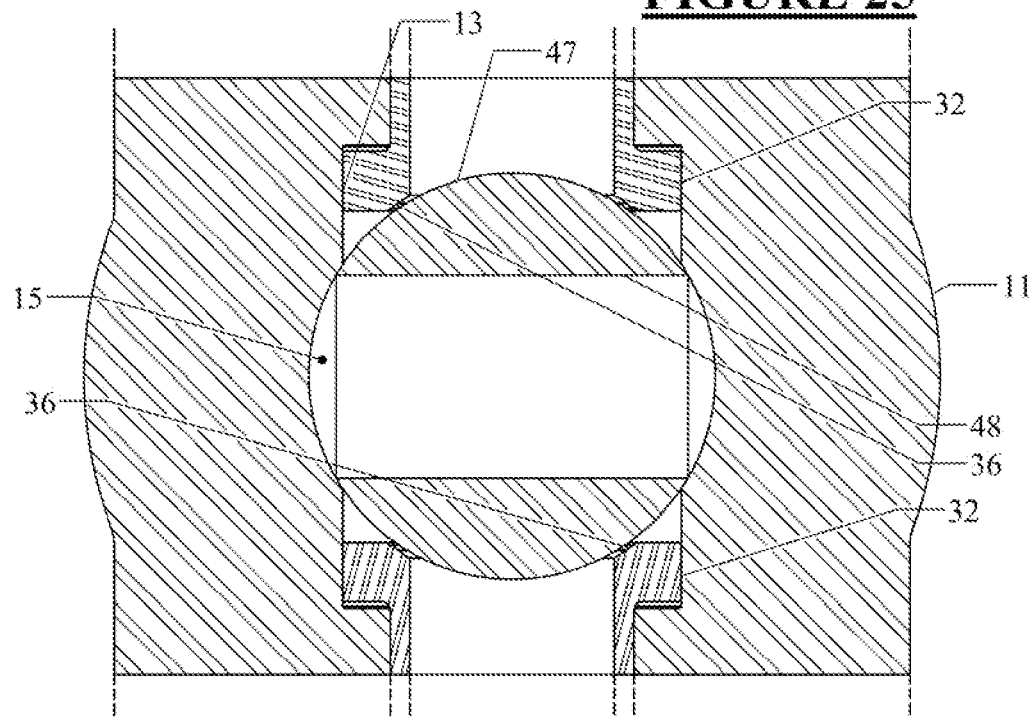
FIG. 25 is a cross-sectional view taken on the horizontal plane through the flow axis the closed valve and perpendicular to the axis of the transverse port of the valve. The valve seats are shown cammed off from the surface of the ball preparatory to rotating the ball to its open position.
Figure 26:
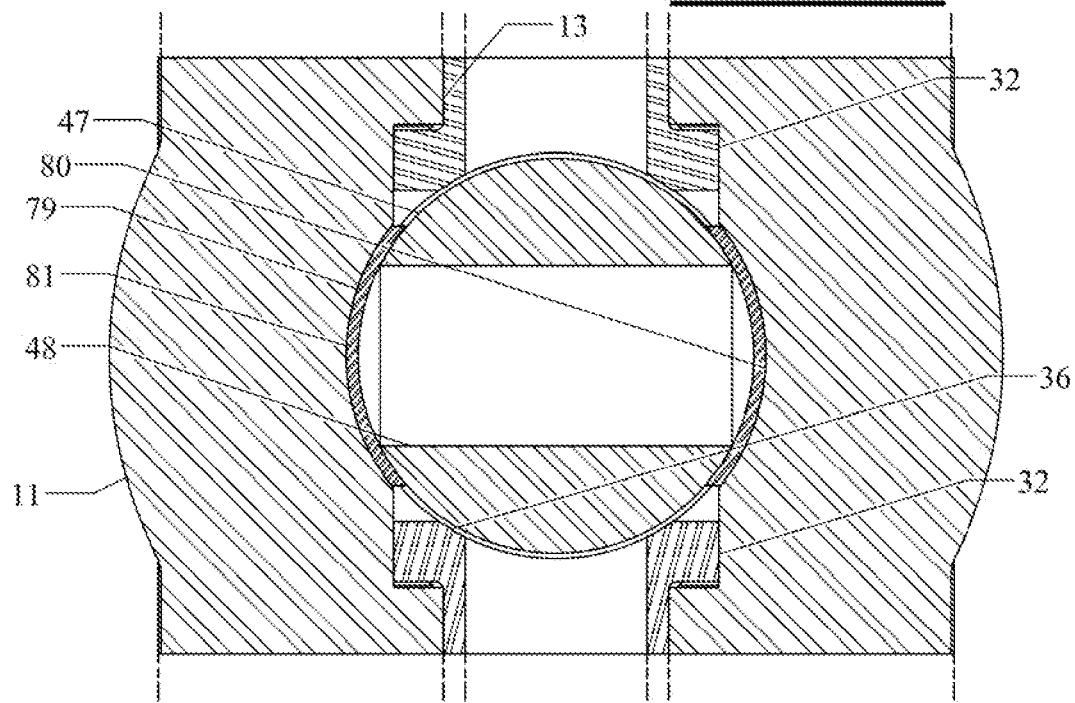
FIG. 26 corresponds to FIG. 25, but is taken at a distance approximately one sixth of the valve bore outwardly in the direction of the transverse port of the valve body.

Referring to FIGS. 24, 25 and 26, the relative sizes of the bypass flow areas around the ball 46 and cam 56, seen in FIG. 24, can be compared with the relatively much larger circular flow gaps between the seats 32 and the ball 46 when the seats are fully displaced from the ball by the cam 56. The eccentricity of the cam 56 is such that the gaps between the fully displaced seats and the ball 46 are more than an order of magnitude larger than the bypass flow areas.

The consequence of this difference in gap sizes is that bypassing flow velocities are much larger and more erosive between the ball 46 and cam 56 and their surrounding components than between the ball and its seats 32. The resulting wear is mainly on the portions of the elliptical cam disk 57 and the inner cylindrical surfaces of the filler pieces 79. The portions of the cam elliptical disk 57 which are most exposed to erosive wear are normally lightly loaded during valve operation. Hence, such wear on the cam 56 is more tolerable than if it were on a highly loaded portion of the disk. Likewise, the resulting bypass wear on the body 11 and ball 46 is not in a portion of the ball which bears on the seat when the ball is closed.

Figure 13:
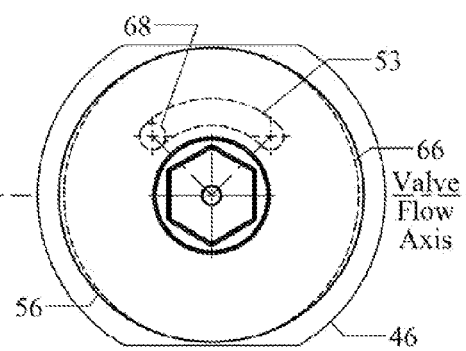
FIG. 13 is a view looking downwardly along the valve axis at the ball and cam with the ball in its closed position, with the cam having been rotated 90° counterclockwise from its position in FIG. 12 to displace the seats from the surface of the ball.
Figure 14:
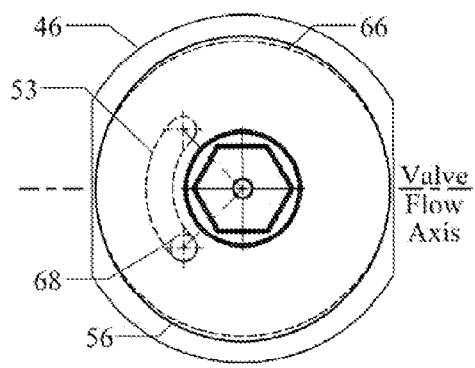
FIG. 14 is a view looking downwardly on the valve axis at the ball and cam with the ball having been rotated 90° counterclockwise from its position in FIG. 13 to its open position by further 90° counterclockwise rotation of the cam. The additional rotation of the elliptical cam has permitted the seats to reseal against the ball.
Figure 15:
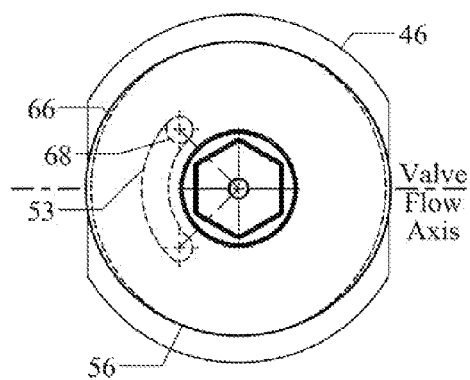
FIG. 15 corresponds to FIGS. 12, 13, and 14, wherein the cam has been rotated clockwise from its position in FIG. 14 in order to prepare to reclose the valve. The rotation of the elliptical cam has displaced the seats from the surface of the ball.

The ball 46 in FIGS. 25 and 26 is not rotated from its closed position when the opening movement of the cam 56 causes the camming pin 68 to move from its position shown in FIG. 12 to that shown in FIG. 13. A small amount of coupled rotation of the cam 56 and the ball 46 from the position shown in FIGS. 13, 25, and 26 causes the bore 48 of the ball 46 to become sufficiently aligned with the bores of the seats 32 and the body 11 to permit flow through the bore 48 of the ball. The opening of that additional bore flow path during ball rotation from the position shown in FIG. 13 to that in FIG. 14 causes the velocities in the aforementioned flow bypass channels to rapidly drop to non-erosive levels.

Figure 17:
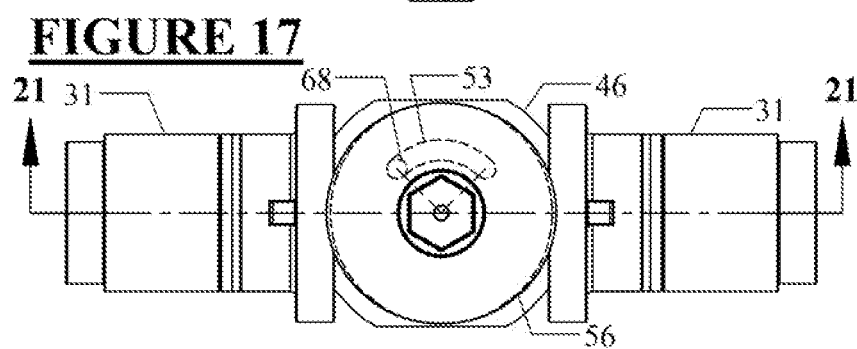
FIG. 17 corresponds to FIG. 16, but shows the cam having been rotated 90° counterclockwise to lift the seats off the ball preparatory to valve opening.
Figure 21:
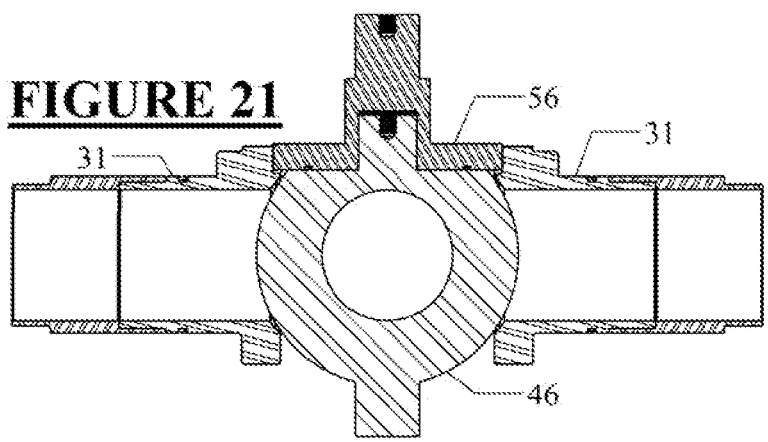
FIG. 21 is a longitudinal section taken through the assembly of FIG. 17 on the section line 21-21.

When the camming pin 68 encounters the end of the 90° slot 53 of the ball 56 as seen in FIGS. 13, 17, and 21, rotation of the ball can initiate. This ball rotation results from further rotation of the cam counterclockwise from the position shown in FIG. 13. As the ball 46 is being rotated by the further rotation of the elliptical cam 56, the diameter of the cam sections bearing on the cam pockets 35 of the seats 32 decreases, so that the gaps between the seats 32 and the ball 46 decrease and eventually are eliminated as the ball becomes fully open. The valve stem 94 rotates 180° in order to move the ball 46 from its fully closed position to its fully open position.

Figure 18:
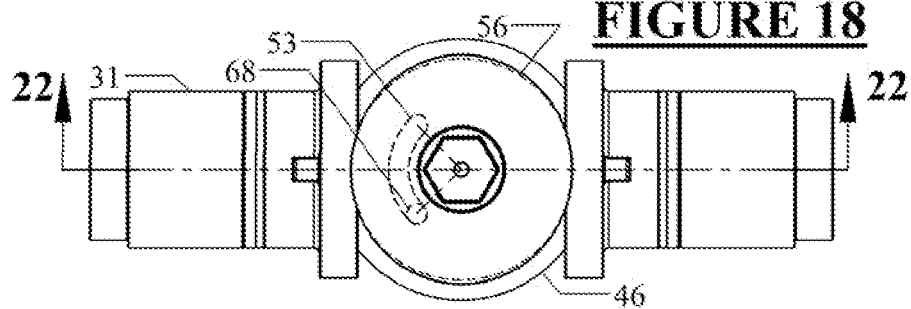
FIG. 18 corresponds to FIG. 17, but both the ball and the cam have been rotated counterclockwise an additional 90° in order to open the ball.
Figure 22:
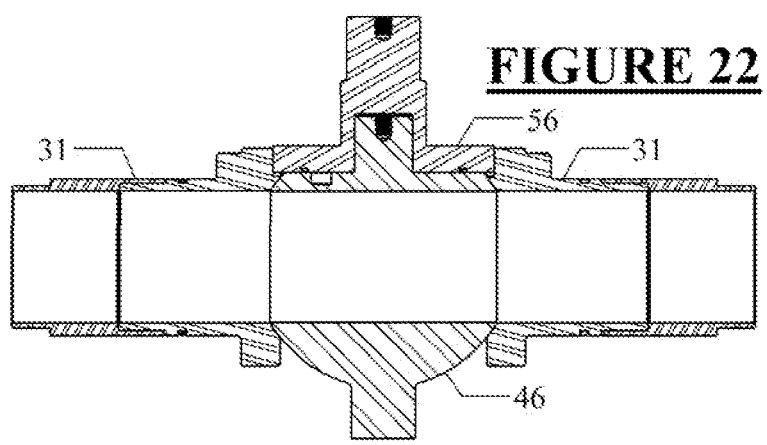
FIG. 22 is a longitudinal section taken through the assembly of FIG. 18 on the section line 22-22.

The closure of the ball 46 from its open position is somewhat similar to the ball opening operation. During ball closure, the initial 90° of rotation of the valve stem 94 again shifts the valve seats 32 out of sealing engagement with the spherical surface 47 of the ball 46. The starting position for the initial cam 56 rotation to lift the seats 32 off the ball prior to the initiation of ball closure is shown in FIGS. 18 and 22. Following this initial 90° of closing rotation of the valve stem 94 and cam 56, the camming pin 68 encounters the other end of the camming slot 53 of the ball 46.

Figure 19:
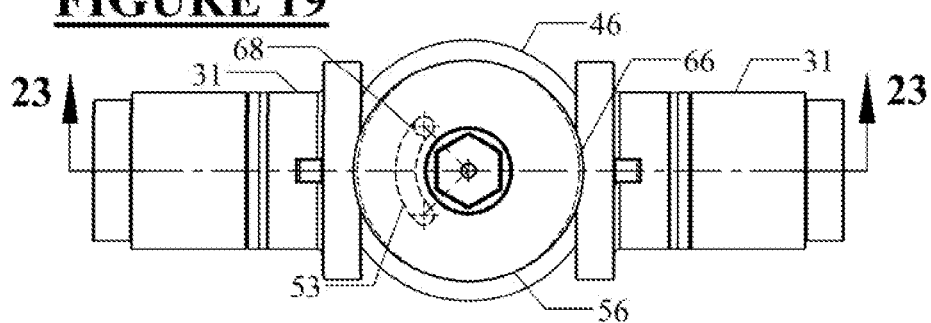
FIG. 19 corresponds to FIG. 18, but the cam has been rotated 90° clockwise and the seats displaced from the ball preparatory to closing the ball.
Figure 23:
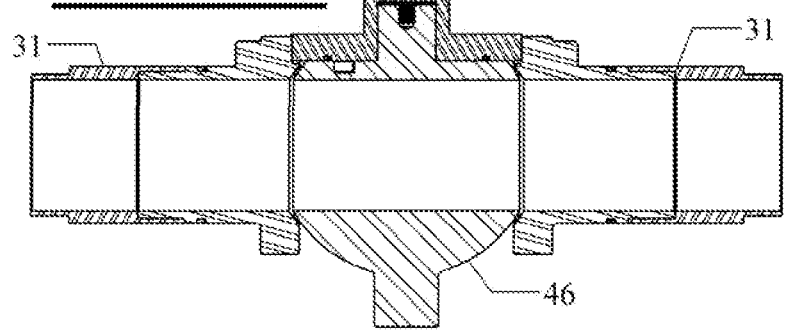
FIG. 23 is a longitudinal section taken through the assembly of FIG. 19 on the section line 23-23.

During the subsequent 90° of additional rotation from the position with the seats 32 cammed off the ball 46 as shown in FIGS. 19 and 23, the flow passage 48 of the ball is also rotated 90° with the cam 56 so that it is perpendicular to the flow passages of the seats 32 and the body 11. At that point, the cam 56 has simultaneously rotated sufficiently so that the spring biased seats 32 can reseal against the ball.

Due to fabrication tolerance variations, some initial clearance gap is unavoidable between the cam 56 and the cam pockets 35 of the engaged seats 32 during the initiation of valve closing. This results in the necessity to rotate the cam 56 a few degrees before the cam 56 can begin to displace the seats 32 from the ball 46.

As shown in FIG. 4, the angle between the elliptical minor axis of the cam 56 and the radius to the camming pin mounting hole 60 is A. Angle A in the drawings is shown as 45°. However, using a value of angle A which is slightly larger than 45° causes a delayed liftoff of the seats 32 with the surface of the valve 10 prior to full valve opening. Likewise with angle A slightly larger than 45°, for the closing of the valve 10, the reseating of the seats 32 is achieved slightly prior to the valve flow passage 48 being aligned at 90° from the through flow passages for the valve 10. While using a value of the angle A slightly greater than 45° leads to slightly more friction during valve closure, this situation may be preferable for minimizing erosion in high pressure operation. As a practical matter, the value of A probably should be limited to no more than 50°.

The actuator used for operation of the ball 46 and cam 56 of this valve 10 will be provided with travel stops to ensure that the valve stem 94 and the cam assembly 55 are only rotated 180 degrees, rather than the usual 90 degrees. If manual actuation with a rotary handle is desired, a one-to-two motion multiplying gearbox will be located between the upper hex 98 of the valve stem 94 and the handle. Neither style of actuation is shown herein, but both types are readily understood by those skilled in the art. The provision of bearings to support the valve stem markedly lowers the friction associated with valve operation under pressure. Use of a rapid acting actuator is highly desirable to further minimize wear during valve shifting.

ADVANTAGES OF THE INVENTION

Like conventional quarter turn ball valves, the ball is reversibly rotatable between its two end positions. However, the provision of valve seats which can be reciprocably moved out of sealing engagement with the ball prior to valve movement and then reseated when movement is complete results in much improved valve life. This is particularly desirable in the case when the fluid media passing through the valve is either abrasive or is high pressure gas.

When the seats 32 are lifted off the closed ball 46 during opening, a potential flow path is opened. However, as may be seen in FIG. 24, the additional flow restriction path resulting from the close clearances existing between the ball 46, the filler pieces 79, the cam 56, the cavity seal disk 70, and the body 11 is relatively small compared to the maximum size of the flow path between the seats 32 and the ball 46. Accordingly, the relatively small flow bypass restrictions between the other valve components serve to highly restrict the flow between the seats 32 and the ball 46.

Additionally, the pressure drop for the valve with the seats cammed off is also shared by the gap between the ball 46 and both of its seats 32. The same flow restriction situation occurs when the ball 46 is nearing closure. The limiting of the flow thus reduces flow induced erosion of the ball 46 and its seats 32 when the ball opening sequence initiates. Likewise, the limiting of the flow thus reduces flow induced erosion of the ball 46 and its seats 32 when the ball closing sequence is being completed.

The fabrication costs of the quarter turn ball valve of the present invention are reduced in comparison to the costs of a gate valve having the same bore and capable of performing at the same service pressures. The quarter turn ball valve of the present invention is also readily serviceable through its bonnet opening while still connected in its flow circuit.

The foregoing has described several aspects of the present invention. It should be appreciated by those skilled in the art that the conception and the specific embodiment disclosed might be readily utilized as a basis for modifying or redesigning the structures for carrying out the same purposes as the invention.

For example, various changes can be made to the construction of the quarter turn reciprocating seat ball valve or different materials can be used for reasons of corrosion or temperature resistance. Furthermore, different spring types such as wave springs can be substituted for the coiled seat bias springs shown herein. Elastomeric seals integral with the seats can be used provided operating pressures are not excessive. Other minor changes can render the valve fire safe. These and other changes do not depart from the spirit and scope of the invention as set forth in the appended claims.

What is claimed is:

1. A quarter-turn valve comprising:
   (a) a valve body having a tubular bore flow passage and an intersecting transverse port, wherein the transverse port is closed on one end with a bonnet flange;
   (b) a ball valve housed within the valve body and having a valve flow passage, wherein the ball valve is rotatable about a rotational axis transverse to valve flow passage to either an open position, where said valve flow passage is aligned with the bore flow passage to permit flow, or a closed position, where the valve flow passage is misaligned with the bore flow passage to prevent flow;
   (c) an arcuate groove concentric with the rotational axis on an upper face of the ball valve;
   (d) a pair of opposed ball seats with each seat having a cam pocket, wherein the ball seats are axially reciprocal between a first seat position where each ball seat has a spherical sealing face sealingly comated with a sealing surface of the ball valve and a second seat position where each ball seat is displaced from the sealing surface of the ball valve;
   (e) a rotatable cam attached to the valve ball with a cam axis of rotation concentric with the rotational axis of the ball valve, the cam having
      (i) an eccentric camming disk selectably rotatable to engage the cam pocket of each ball seat, wherein the ball seats are reciprocated between the first seat position and the second seat position by rotation of the eccentric camming disk, and
      (ii) a camming pin rotationally engaged in the arcuate groove of the ball valve;
   (f) a rotatable valve stem rotationally engaged with the cam and the ball valve; and
   (g) a flow restricting means for restricting the flow around the ball valve whenever the ball seats are in the second seat position.

2. The quarter-turn valve of claim 1, wherein the camming disk is elliptical and wherein the cam pocket of each ball seat has an elliptical face.

3. The quarter-turn valve of claim 1, wherein the camming disk is symmetrical about two orthogonal planes through a cam axis of rotation.

4. The quarter-turn valve of claim 3, wherein the axially reciprocable valve seats are selectably engagable by rotation of the cam, wherein when the cam is in a first cam position the ball seats are in the first seat position and the ball valve is closed, when the cam is in a second cam position the ball seats are in the second seat position and the ball valve is closed, and when the cam is in a third cam position the ball seats are in the first seat position and the ball valve is open.

5. The quarter-turn valve of claim 4, wherein ball valve is rotated ninety degrees between the open and closed positions and the cam is rotated one hundred eighty degrees by the valve stem to move the cam between the first cam position and the third cam position.

6. The quarter-turn valve of claim 5, wherein the camming pin is moved from a first end of the arcuate groove of the ball valve to an opposed second end of the groove prior to rotation of the ball valve.

7. The quarter-turn valve of claim 3, wherein the axially reciprocable valve seats are selectably engagable by rotation of the cam, wherein when the cam is in a first cam position the ball seats are in the first seat position and the ball valve is open, when the cam is in a second cam position the ball seats are in the second seat position and the ball valve is open, and when the cam is in a third cam position the ball seats are in the first seat position and the ball valve is closed.

8. The quarter-turn valve of claim 1, wherein the flow restricting means comprises a non-rotatable cavity seal mounting a pair of diametrically opposed filler pieces that have a close fit to the flow bore passage, the spherical surface of the ball valve and a largest diameter portion of the camming disk.

9. The quarter-turn valve of claim 1, wherein each ball seat includes an antirotation key.

10. The quarter-turn valve of claim 1, further comprising a ball seat extension in communication with a side of each ball seat opposite the ball valve.

11. A quarter-turn valve comprising:
(a) a valve body having a tubular bore flow passage and an intersecting transverse port, wherein the transverse port is closed on one end with a bonnet flange;
(b) a ball valve housed within the valve body and having a valve flow passage, wherein the ball valve rotates ninety degrees about a rotational axis transverse to valve flow passage to either an open position, where the valve flow passage is aligned with the bore flow passage to permit flow, or a closed position, where the valve flow passage is misaligned with the bore flow passage to prevent flow;
(c) an arcuate groove concentric with the rotational axis on an upper face of the ball valve;
(d) a pair of opposed ball seats with each seat having a cam pocket, wherein the ball seats are axially reciprocable between a first seat position where each ball seat has a spherical sealing face sealingly comated with a sealing surface of the ball valve and a second seat position where each ball seat is displaced from the sealing surface of the ball valve;
(e) a rotatable cam attached to the valve ball wherein the cam rotates 180 degrees about a cam axis of rotation concentric with the rotational axis of the ball valve, the cam having
(i) an eccentric camming disk selectably rotatable to engage the cam pocket of each ball seat, wherein the ball seats are reciprocated between the first seat position and the second seat position by rotation of the eccentric camming disk, and
(ii) a camming pin rotationally engaged in the arcuate groove of the ball valve;
(f) a rotatable valve stem rotationally engaged with the cam and the ball valve, the valve stem passing from the ball valve through the bonnet; and
(g) a non-rotatable cavity seal mounting a pair of diametrically opposed filler pieces that have a close fit to the flow bore passage, the spherical surface of the ball valve and a largest diameter portion of the camming disk.

12. The quarter-turn valve of claim 11, wherein the camming disk is elliptical and wherein the cam pocket of each ball seat has an elliptical face.

13. The quarter-turn valve of claim 11, wherein the camming disk is symmetrical about two orthogonal planes through a cam axis of rotation.

14. The quarter-turn valve of claim 13, wherein the axially reciprocable valve seats are selectably engagable by rotation of the cam, wherein when the cam is in a first cam position the ball seats are in the first seat position and the ball valve is closed, when the cam is in a second cam position the ball seats are in the second seat position and the ball valve is closed, and when the cam is in a third cam position the ball seats are in the first seat position and the ball valve is open.

15. The quarter-turn valve of claim 14, wherein the camming pin is moved from a first end of the arcuate groove of the ball valve to an opposed second end of the groove prior to rotation of the ball valve.

16. The quarter-turn valve of claim 13, wherein the axially reciprocable valve seats are selectably engagable by rotation of the cam, wherein when the cam is in a first cam position the ball seats are in the first seat position and the ball valve is open, when the cam is in a second cam position the ball seats are in the second seat position and the ball valve is open, and when the cam is in a third cam position the ball seats are in the first seat position and the ball valve is closed.

17. The quarter-turn valve of claim 11, wherein each ball seat includes an antirotation key.

18. The quarter-turn valve of claim 17, further comprising a ball seat extension in communication with a side of each ball seat opposite the ball valve.

19. The quarter-turn valve of claim 11, wherein the filler pieces have a hemispherical surface proximal the sealing surface of the ball valve.

20. A quarter-turn valve comprising:
(a) a valve body having a tubular bore flow passage and an intersecting transverse port, wherein the transverse port is closed on one end with a bonnet flange;
(b) a ball valve housed within the valve body and having a valve flow passage, wherein the ball valve rotates ninety degrees about a rotational axis transverse to valve flow passage to either an open position, where the valve flow passage is aligned with the bore flow passage to permit flow, or a closed position, where the valve flow passage is misaligned with the bore flow passage to prevent flow;
(c) an arcuate groove concentric with the rotational axis on an upper face of the ball valve;
(d) a pair of opposed ball seats with each seat having a cam pocket and an antirotation key, wherein the ball seats are axially reciprocable between a first seat position where each ball seat has a spherical sealing face sealingly comated with a sealing surface of the ball valve and a second seat position where each ball seat is displaced from the sealing surface of the ball valve;

(e) a rotatable cam attached to the valve ball wherein the cam rotates 180 degrees about a cam axis of rotation concentric with the rotational axis of the ball valve, the cam having
  (i) an eccentric camming disk selectably rotatable to engage the cam pocket of each ball seat, wherein the ball seats are reciprocated between the first seat position and the second seat position by rotation of the eccentric camming disk, and
  (ii) a camming pin rotationally engaged in the arcuate groove of the ball valve;
(f) a rotatable valve stein rotationally engaged with the cam and the ball valve, the valve stem passing from the ball valve through the bonnet; and
(g) a non-rotatable cavity seal mounting a pair of diametrically opposed filler pieces that have a close fit to the transverse port, the spherical surface of the ball valve and a largest diameter portion of the camming disk.

21. The quarter-turn valve of claim 20, wherein the camming disk is symmetrical about two orthogonal planes through the cam axis of rotation and wherein rotation of the cam by the valve stem initially displaces the ball seats from the ball sealing surface and subsequently rotates the ball valve from either an open or a closed position while permitting the ball seats to reseal to the sealing surface of the ball valve by the completion of the ball rotation.

\* \* \* \* \*